United States Patent

Groves

Patent Number: 5,899,019
Date of Patent: May 4, 1999

[54] STRIPPING TOOL

[76] Inventor: Gavin D. Groves, 1416 E. Columbia #7, Seattle, Wash. 98122

[21] Appl. No.: 08/884,062

[22] Filed: Jun. 27, 1997

Related U.S. Application Data

[60] Provisional application No. 60/020,551, Jun. 28, 1996.

[51] Int. Cl.$^6$ .................................................. A01C 29/00
[52] U.S. Cl. .......................................................... 47/1.01
[58] Field of Search ................................ 47/1.01; 7/114; 30/175

[56] References Cited

U.S. PATENT DOCUMENTS

| 64,823 | 5/1867 | Worsham | 7/114 |
|---|---|---|---|
| 1,640,635 | 8/1927 | Atkins | 47/1.01 R |
| 1,702,801 | 2/1929 | Smith | 47/1.01 R |
| 2,138,726 | 11/1938 | Cartwright | 47/1.01 R |
| 2,841,924 | 7/1958 | Fink | 47/1.01 R |
| 5,711,075 | 1/1998 | Wolf | 30/28 |

FOREIGN PATENT DOCUMENTS

| 332730 | 9/1989 | European Pat. Off. | 47/1.01 B |
|---|---|---|---|
| 394594 | 10/1989 | European Pat. Off. | 47/1.01 B |
| 963382 | 7/1950 | France | 47/1.01 B |
| 1178340 | 5/1959 | France | 47/1.01 B |
| 1180816 | 7/1959 | France | 47/1.01 B |
| 1133037 | 3/1960 | France | 47/1.01 B |
| 198967 | 8/1907 | Germany | 47/1.01 B |
| 1062477 | 7/1959 | Germany | 47/1.01 B |
| 3818640 | 12/1989 | Germany | 47/1.01 B |

*Primary Examiner*—Michael J. Carone
*Assistant Examiner*—Fredrick T. French, III

[57] ABSTRACT

A stripping tool for removing thorns, excess foliage and the like from plant stems having a handle with opposed stripping blades on one end. The handle has a pivot that normally holds the handle in an open position to allow a plant stem to be inserted therebetween. Manually squeezing the handle causes the handle to pivot about the connecting pivot bringing the stripping blades into contact with a stem. The handle is of a predetermined shape so as to provide a substantially hollow interior area thereby generally enclosing the plant stem. Thus the handle becomes a barrier between the users hand and the plant stem providing protection and generally containing the stripped thorns and foliage.

1 Claim, 3 Drawing Sheets

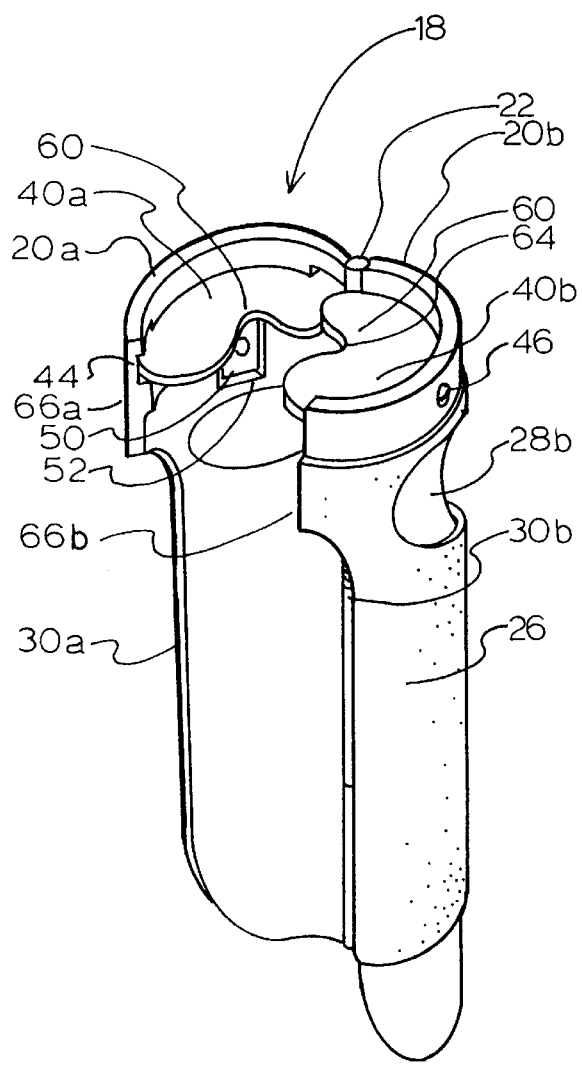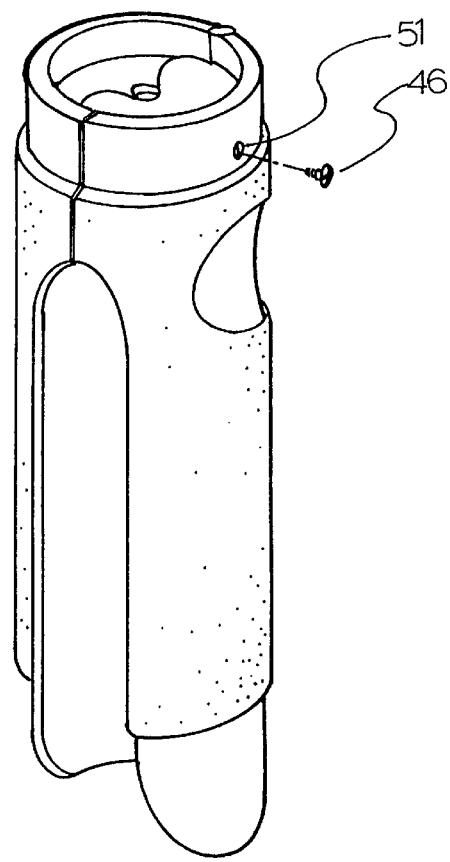
FIG. 1
FIG. 2

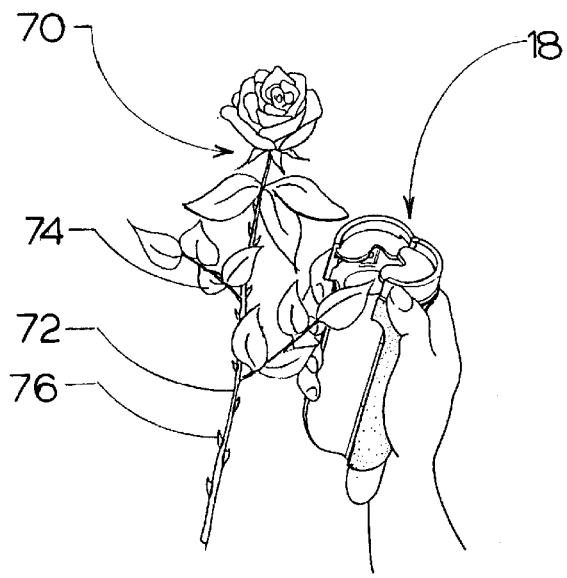
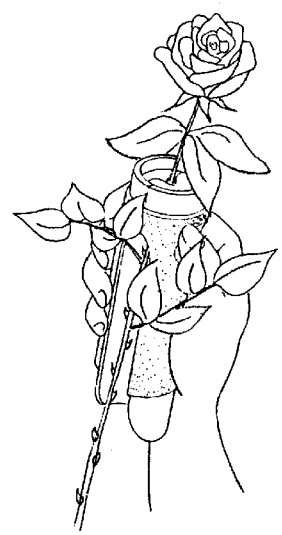
FIG. 7　　　　　FIG. 8
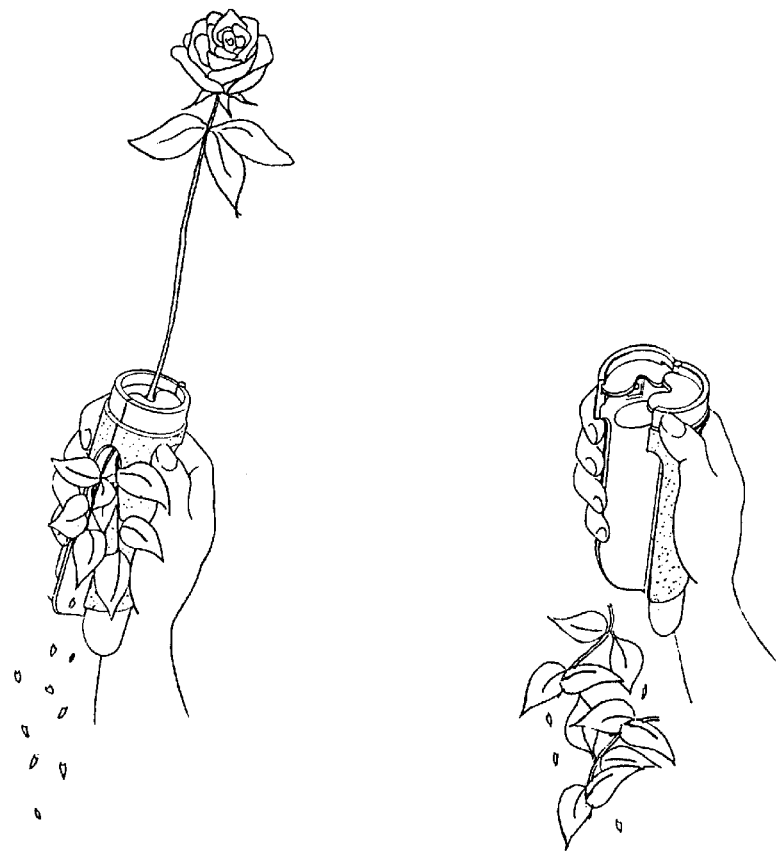
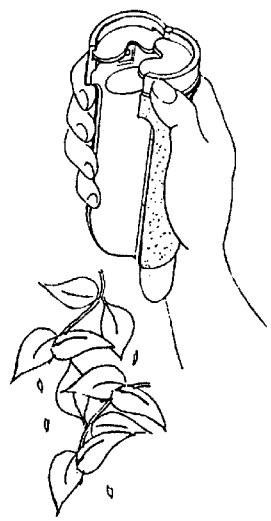
FIG. 9　　　　　FIG. 10

STRIPPING TOOL

This is a continuation of application Ser. No. 60/020,551 filed Jun. 6, 1996.

BACKGROUND-FIELD OF INVENTION

This invention relates to certain new and useful improvements in a stripping tool for removing thorns, foliage and other protuberances from the stem of a plant, specifically to an improved handle mechanism for a stripping tool.

BACKGROUND-DESCRIPTION OF PRIOR ART

Removal of thorns, foliage, or other protuberances from flowers or other plants is commonly practiced by florists prior to using the flower or plant, ease of use, speed, quality of job performed by the tool and safety are all primary concerns to the florist during the stem cleaning process.

Various manually held devices that aid the florist in dethorning have been proposed. For instance, U.S. Pat. No. 2,806,325 issued to Fox describes a U-shaped tool with two free ends on which stripping blades are formed facing inward toward each other. The stripping tool is positioned around a flower stem and moved down along the length of the stem to remove thorns. However, this type of tool offers no protection from thorns during the stripping operation. This problem has been partially solved by implementation of semicylindrical half shells as shown in European patents 394,594 issued to Heumann and 332,730 issued to Grossi. While offering protection these strippers still suffer from a number of disadvantages:

(a) A stem stripper of the type in present use is prone to capturing stripped foliage and thorns requiring the user to manually clean out the inner cavity thus exposing the user to puncture or cuts by thorns contained therein.

(b) A stem stripper of the type in present use does not allow for continuous operation because captured material must be removed. This is especially problematic when large numbers of roses require stripping.

(c) Stem strippers of the type in present use are prone to pinching foliage between the free edges when the half shells are squeezed closed interfering with the stripping tools ability to fully close.

(d) Stem strippers of the type in present use tears foliage from the stem removing the stems bark and shortening the flowers life by pinching foliage along the fee edge away from the stem pulling the foliage away from the stem when the tool is drawn down. Foliage should be removed as close to the stem as is possible to prevent such tearing.

OBJECTS AND ADVANTAGES

Accordingly, several objects and advantages of the present invention are:

(a) To provide a thorn and foliage stripper that is self cleaning by allowing thorns and stripped foliage to easily drop out of an interior cavity.

(b) To provide a thorn and foliage stripper that can be used continuously.

(c) To provide a thorn and foliage stripper that reduces the pinching of foliage between the free edges of the shell handles allowing the shell handles to fully close.

(d) To provide a thorn and foliage stripper that increases the ability of the stripping tool to remove foliage close to the stem thus reducing the tearing of the stems skin.

Further objects and advantages are to provide a thorn and foliage stripper which is simple and safe to use while being inexpensive to manufacture. Still further objects and advantages will become apparent from consideration of the ensuing descriptions and drawings.

DRAWING FIGURES

FIG. 1 shows a stripping tool in perspective view in its normally open position.

FIG. 2 shows a stripping tool in perspective view in its closed position as if squeezed by hand.

FIGS. 7–10 shows the operation of a stripping tool.

REFERENCE NUMERALS IN DRAWINGS

Figure 3:
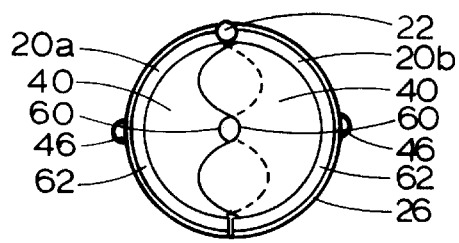
FIG. 3 is a plan view of a stripping tool.

In the Drawings, closely related parts have the same number but different alphabetic suffixes.

18 typical embodiment of present stripping tool
20$a$ "a" side shell handle
20$b$ "b" side shell handle
22 pivot
24 spring
26 padded non-slip grip material
28$a$ "a" side finger support
28$b$ "b" side finger support
30$a$ "a" side cutback
30$b$ "b" side cutback
40$a$ "a" side stripping blade
40$b$ "b" side stripping blade
42 blade securing tab
44 channel in handle that receives stripping blade
46 blade securing screw
50 blade tab hole
51 hole in handle for blade securing screw
52 recessed area for blade securing tab 42
60 "V" shaped stripping notch
62 back edge (nonstripping edge) of stripping blade
64 stripping edge of stripping blade 40
66$a$ free edge of "a" side of stripping tool shell handle
66$b$ free edge of "b" side of stripping tool shell handle
70 flower
72 flower stem
74 flower foliage
76 thorns

DESCRIPTION-FIGS. 1 to 6

A typical embodiment of the stripping tool of the present invention is illustrated in FIGS. 1–6. The stripping tool consists primarily of shell handles 28$a,b$ with a pivot 22, stripping blades 40$a,b$, a finger support 28$a,b$, and a cushioned non-slip gripping material 26 mounted to the outside surface of the shell handles.

FIG. 1 shows an overall view of the stripping tool of the invention with the handle in an open position. The handle is of a predetermined shape so as to provide a substantially hollow area therein. In the preferred embodiment the shape is semi-circular in cross section when the section is taken perpendicular to a longitudinal axis of the handle, this is best shown in FIG. 3 which is a top view of the stripping tool.

Shell handles 20a,b are made of a material rigid enough so as not to collapse or greatly deform when squeezed by hand. In the preferred embodiment the handle is made of a plastic such as polystyrene or ABS (acrylonitrile-butadine-styrene) by means of an injection molding process.

Figures 4, 5:
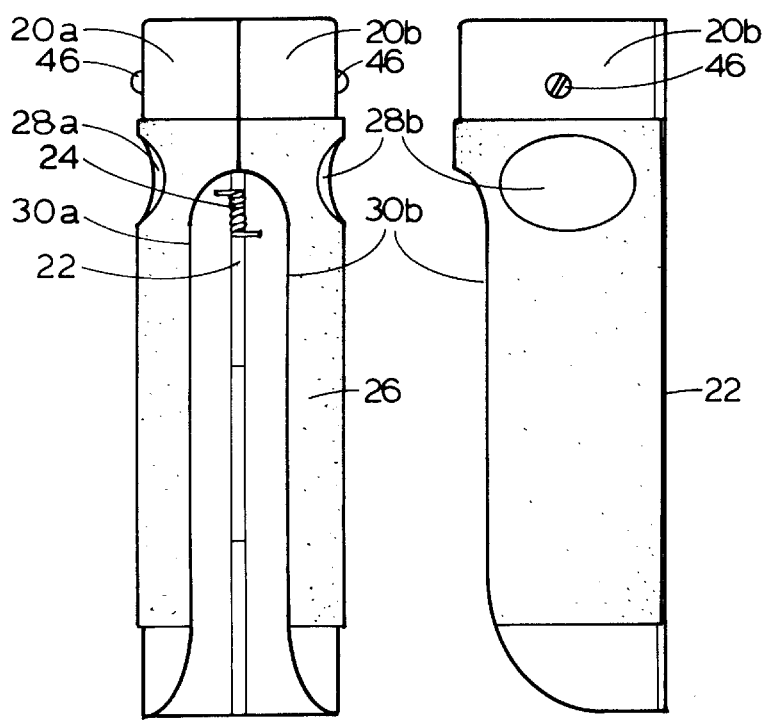
FIG. 4 is a front view of a stripping tool.
FIG. 5 is a side view of a stripping tool.

A pivot 22 is located along a longitudinal section of the handle, as best shown in FIG. 4 (front view). In the preferred embodiment the pivot is an integrated spring loaded hinge 22. Spring 24 normally holds free edges 66a,b of shell handles 20a, b in an open position.

Along a longitudinal edge, opposed to the pivot, is a cut-back section 30a,b that terminates before reaching the stripping blades. As best shown in FIG. 2 this cutback section reduces the contact area along the free edges when shell handles 20a,b are squeezed together. The cutback section reduces the area in which foliage 74 or stems 72 could get pinched interfering with the handles ability to fully close, as well as allowing foliage to drop out of the interior cavity, the tool then being self cleaning and adapted for continuous use.

Located at one end of shell handles 20a,b are stripping blades 40a,b which are mounted projecting inward substantially at a right angle with respect to the longitudinal axis of shell handles 20a,b. The stripping blades have a substantially "V" shaped notch that provides a stripping edge 64.

Figure 6:
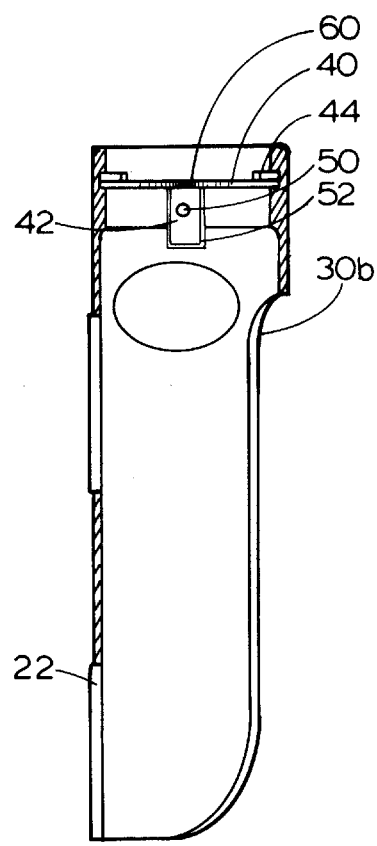
FIG. 6 shows a section view of one half (b side) of a stripping tool.

In the preferred embodiment the blades are secured to the shell handle with the use of a tab 42, as best seen in FIG. 6, that projects off of a back edge 62 (edge opposite the notch) of blades 40a,b and bent to a substantially right angle with respect to the planar surface of blade 40a,b and parallel to the shell handles longitudinal axis. A hole 50 is located in the approximate center of tab 42 that is threaded (tapped) to accept a securing screw 46. The blades are mounted into shell handles 20a,b by means of a channel 44 that accepts the blade thickness. Channel 44 is molded into the inside surface of shell handles 20a,b in such a position that blades 40a,b overlap. A recessed area 52 below channel 44 is molded to provide a seat for tab 42. A hole 51 is located in the shell handle at the approximate center of the recessed tab area that corresponds to the hole on the tab. Hole 50 in shell handles 20a,b allow a securing screw 42 to pass through handle body 20a,b and into the blade securing tab.

To prevent slipping of the hand while operating the stripping tool of the preferred embodiment shell handles 20a,b are equipped with finger supports 28a,b that are molded onto the outside surface for fingers or thumb.

OPERATION-FIGS 7–10

The manner of using the stripping tool to remove thorns 76 and foliage 74 from flowers 70 as depicted in FIGS. 7–10 is as follows. One first places a flower stem 72 between stripping blades 40a,b at the uppermost point, below the flower, which is to be cleaned of thorns 76 and foliage 74. Shell handles 20a,b are then manually squeezed pivoting the shell handles about the pivot bringing the fee edges toward each other and the stripping blades into contact with a plant stem 72. This captures the stem between the stripping blades. Next, with the free hand firmly holding the flower stem just below the flow draw the stripping tool down the stem to remove thorns 76 and foliage 74. Once free of the stem the hand holding the stripping tool is relaxed allowing the stripping tool to open, dropping the stripped foliage out of the interior of the handle. The stripping tool is now ready to accept the next flower.

SUMMARY, RAMIFICATIONS, AND SCOPE

Accordingly, the reader will see that the stripping tool of this invention can be used to strip thorns and foliage from roses or other plants easily and effectively, as well as being safe and comfortable to use.

it provides a stripping tool that is self cleaning, it provides a stripping tool that is able to be used continuously, it provides a stripping tool that is easier to operate and reduces the chance of damaging, cutting or gouging a plant stem during the dethorning process, Although the description above contains many specificities, these should not be construed as limitations on the scope of the invention, but rather as an exemplification of one preferred embodiment of this invention.

Accordingly, the scope of the invention should be determined not by the embodiment illustrated, but by the appended claims and their legal equivalents.

I claim:

1. An apparatus for removing protuberances extending from a plant stem comprising two longitudinally elongated semicylindrical shell handles reciprocally joined along the respective longitudinal edges by a pivot, each said shell handle having a corresponding longitudinal free edge opposed to said joined edge, at least one of said shell handles having a cutback section starting along said free longitudinal edge and extending generally inward toward said joined longitudinal edge, said cutback providing a substantially open area along said free longitudinal edge when said shell handles are closed to form a cylinder.

* * * * *